US011881640B2

(12) United States Patent
Sudo et al.

(10) Patent No.: US 11,881,640 B2
(45) Date of Patent: Jan. 23, 2024

(54) ANTENNA ELEMENT, ANTENNA MODULE, AND COMMUNICATION DEVICE

(71) Applicant: Murata Manufacturing Co., Ltd., Kyoto (JP)

(72) Inventors: Kaoru Sudo, Kyoto (JP); Hirotsugu Mori, Kyoto (JP); Kengo Onaka, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 451 days.

(21) Appl. No.: 17/169,726

(22) Filed: Feb. 8, 2021

(65) Prior Publication Data

US 2021/0167506 A1 Jun. 3, 2021

Related U.S. Application Data

(63) Continuation of application No. PCT/JP2019/030419, filed on Aug. 2, 2019.

(30) Foreign Application Priority Data

Aug. 9, 2018 (JP) ................................ 2018-150512

(51) Int. Cl.
*H01Q 9/04* (2006.01)
*H01Q 1/38* (2006.01)
*H01Q 11/14* (2006.01)

(52) U.S. Cl.
CPC ............. *H01Q 9/0407* (2013.01); *H01Q 1/38* (2013.01); *H01Q 11/14* (2013.01)

(58) Field of Classification Search
CPC ......... H01Q 9/0407; H01Q 1/38; H01Q 11/14
See application file for complete search history.

(56) References Cited

U.S. PATENT DOCUMENTS

2007/0273588 A1* 11/2007 Kim .................... H01Q 9/0407 343/700 MS
2008/0204324 A1 8/2008 Okamura et al.
(Continued)

FOREIGN PATENT DOCUMENTS

JP H09-064636 A 3/1997
JP 2003-332830 A 11/2003
(Continued)

OTHER PUBLICATIONS

International Search Report for PCT/JP2019/030419 dated Oct. 1, 2019.
Written Opinion for PCT/JP2019/030419 dated Oct. 1, 2019.

*Primary Examiner* — Dieu Hien T Duong
(74) *Attorney, Agent, or Firm* — Pearne & Gordon LLP

(57) ABSTRACT

An antenna element includes a dielectric substrate, a first ground electrode, a second ground electrode, a via conductor, and a radiation electrode. The dielectric substrate includes a first portion shaped like a flat plate and a second portion thinner than the first portion. The first ground electrode is arranged in the first portion. The second ground electrode is arranged in the second portion. The via conductor couples the first ground electrode and the second ground electrode. A distance between the radiation electrode and the first ground electrode in a first thickness direction is more than a distance between the radiation electrode and the second ground electrode in a second thickness direction. Part of the radiation electrode lies opposite to the first ground electrode without lying opposite to the second ground electrode.

9 Claims, 13 Drawing Sheets

(56) References Cited

U.S. PATENT DOCUMENTS

| | | | |
|---|---|---|---|
| 2013/0249740 | A1 | 9/2013 | Shedletsky |
| 2014/0306846 | A1 | 10/2014 | Nakatsu et al. |

FOREIGN PATENT DOCUMENTS

| | | | |
|---|---|---|---|
| JP | 2007-013327 | A | 1/2007 |
| JP | 2009-038696 | A | 2/2009 |
| JP | 2014-212361 | A | 11/2014 |
| WO | 2006/011459 | A1 | 2/2006 |
| WO | 2012/081288 | A1 | 6/2012 |

* cited by examiner

ANTENNA ELEMENT, ANTENNA MODULE, AND COMMUNICATION DEVICE

CROSS REFERENCE TO RELATED APPLICATION

This is a continuation of International Application No. PCT/JP2019/030419 filed on Aug. 2, 2019 which claims priority from Japanese Patent Application No. 2018-150512 filed on Aug. 9, 2018. The contents of these applications are incorporated herein by reference in their entireties.

BACKGROUND OF THE DISCLOSURE

Field of the Disclosure

The present disclosure relates to an antenna element, where a radiation electrode and a ground electrode are arranged so as to lie opposite to each other, an antenna module including the antenna element, and a communication device including the antenna module.

Description of the Related Art

An antenna element where a radiation electrode and a ground electrode are arranged so as to lie opposite to each other has been known to date. For example, International Publication No. 2012/081288 (Patent Document 1) discloses a radio frequency package including an antenna where a radiation electrode and a ground conductor plate are arranged so as to lie opposite to each other. The antenna is formed as a stack-type patch antenna including a parasitic element and is provided in a position different from the position of a cavity in a multilayer substrate. The radio frequency package enables it to increase a band for radio frequency signals that can be received while controlling the thickness.

Patent Document 1: International Publication No. 2012/081288

BRIEF SUMMARY OF THE DISCLOSURE

It is known that when a radiation electrode and a ground electrode are arranged so as to lie opposite to each other in an antenna element, a distance with a certain length from the ground electrode needs to be provided so as to keep capacitance coupling between the radiation electrode and the ground electrode at a suitable strength. For example, in the radio frequency package disclosed in Patent Document 1, a portion of the multilayer substrate where a cavity is formed is thinner than a portion of the multilayer substrate where no cavity is formed. The radiation electrode is positioned at a distance with a certain length from the ground conductor plate by being arranged in the portion in the multilayer substrate where no cavity is formed.

When, as in the radio frequency package disclosed in Patent Document 1, a radiation electrode and a ground electrode are arranged in a dielectric substrate having portions different in thickness so as to lie opposite to each other, the radiation electrode and the ground electrode are normally arranged in a thick portion so as to be positioned further away from each other. In some cases, however, depending on the space where the antenna element is arranged, portions that can be formed thick may be limited in the dielectric substrate. In such cases, the radiation electrode and the ground electrode need to be arranged so as to lie opposite to each other in a thin portion in the dielectric substrate, and it may thus be impossible to ensure a distance between the radiation electrode and the ground electrode. As a result, it may be difficult to improve the radiation characteristics of the antenna element.

The present disclosure has been made so as to solve the above-described problems and is aimed at improving the radiation characteristics of an antenna element where a radiation electrode and a ground electrode are arranged so as to lie opposite to each other.

An antenna element according to an embodiment of the present disclosure includes a dielectric substrate, a first ground electrode, a second ground electrode, a via conductor, and a radiation electrode. The dielectric substrate includes a first portion and a second portion. The first portion is shaped like a flat plate. The second portion is thinner than the first portion. The first ground electrode is arranged in the first portion. The second ground electrode is arranged in the second portion. The via conductor couples the first ground electrode and the second ground electrode. In the first portion, the radiation electrode lies opposite to the first ground electrode in a first thickness direction of the first portion. In the second portion, the radiation electrode lies opposite to the second ground electrode in a second thickness direction of the second portion. A distance between the radiation electrode and the first ground electrode in the first thickness direction is more than a distance between the radiation electrode and the second ground electrode in the second thickness direction. Part of the radiation electrode lies opposite to the first ground electrode without lying opposite to the second ground electrode.

An antenna element according to an embodiment of the present disclosure enables it to improve radiation characteristics by part of a radiation electrode lying opposite to a first ground electrode without lying opposite to a second ground electrode.

DETAILED DESCRIPTION OF THE DISCLOSURE

Figure 1:
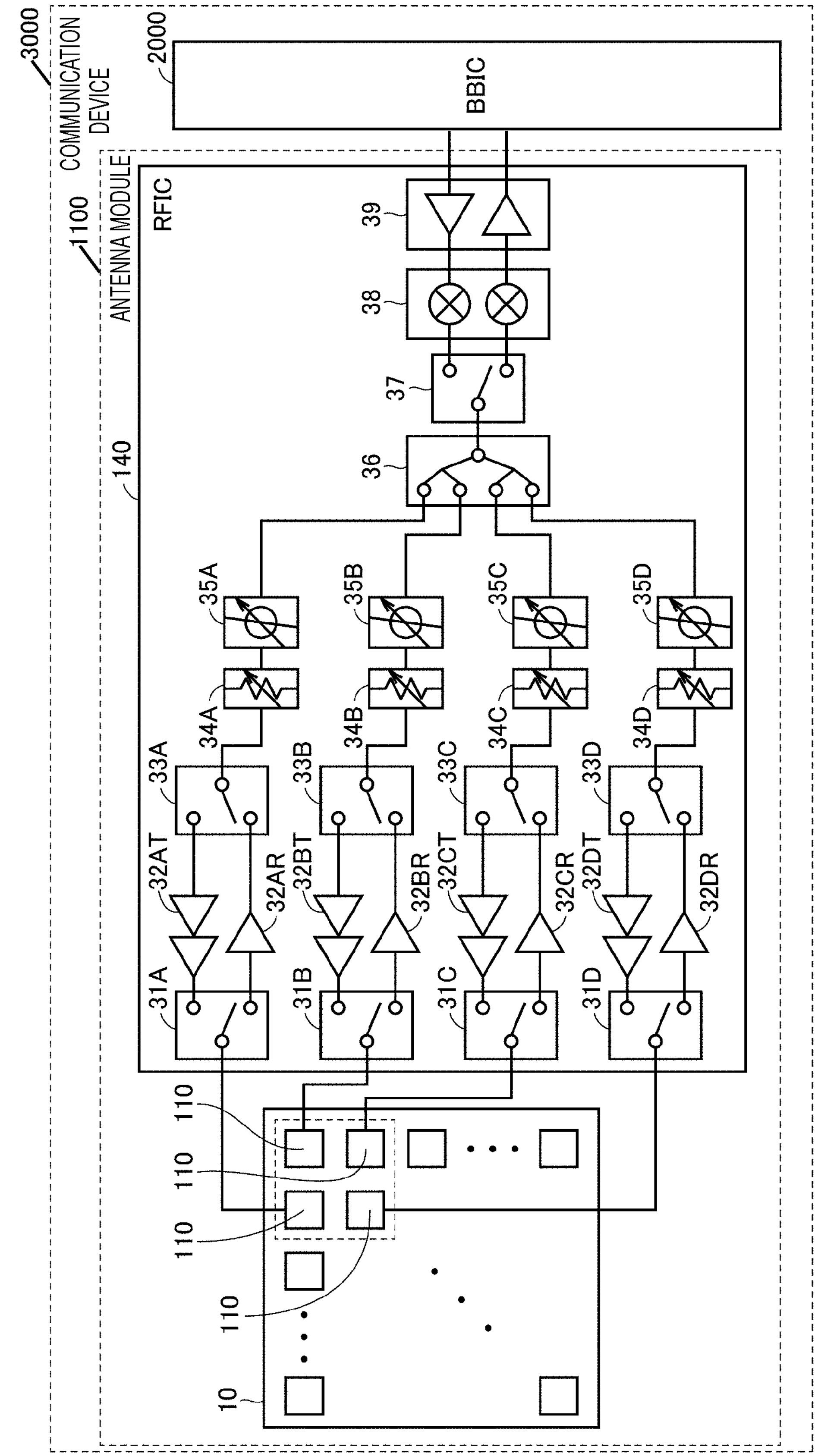
FIG. 1 is a block diagram of a communication device including an antenna element.

Embodiments of the present disclosure are described in detail below with reference to the drawings. Identical or corresponding elements in the drawings are given identical reference signs and the descriptions thereon are not repeated in principle.

FIG. 1 is a block diagram of a communication device 3000, which includes an antenna element 10. A mobile terminal, such as a cellular phone, a smartphone, or a tablet, or a personal computer having a communication function can be named as an example of the communication device 3000.

As illustrated in FIG. 1, the communication device 3000 includes an antenna module 1100 and a baseband integrated circuit (BBIC) 2000, which constitutes a baseband signal processing circuit. The antenna module 1100 includes a radio frequency integrated circuit (RFIC) 140, which is an example of a radio frequency element, and the antenna element 10.

The communication device 3000 up-converts a baseband signal transmitted from the BBIC 2000 to the antenna module 1100 into a radio frequency signal and emits the radio frequency signal from the antenna element 10. The communication device 3000 down-converts a radio frequency signal received at the antenna element 10 into a baseband signal and processes the baseband signal in the BBIC 2000.

The antenna element 10 is an antenna array where a plurality of antenna elements (radiation conductors) each shaped like a flat plate are regularly arranged. In FIG. 1, the configuration of the RFIC 140 that corresponds four radiation electrodes 110 surrounded by the dotted line, among the plurality of radiation electrodes 110 included in the antenna element 10, is illustrated.

The RFIC 140 includes switches 31A to 31D, 33A to 33D, and 37, power amplifiers 32AT to 32DT, low noise amplifiers 32AR to 32DR, attenuators 34A to 34D, phase shifters 35A to 35D, a signal synthesis/branching unit 36, a mixer 38, and an amplification circuit 39.

The RFIC 140 is, for example, formed as a one chip IC component including circuit elements (switches, power amplifiers, low noise amplifiers, attenuators, and phase shifters) corresponding to the plurality of radiation electrodes 110 included in the antenna element 10. Alternatively, aside from the RFIC 140, the circuit elements may be formed as a one chip IC component for each radiation electrode 110.

When radio frequency signals are received, the switches 31A to 31D and 33A to 33D are switched to the sides of the low noise amplifiers 32AR to 32DR, and the switch 37 is coupled to the reception-side amplifier of the amplification circuit 39.

The radio frequency signals received by the radiation electrodes 110 pass through the respective signal paths from the switches 31A to 31D to the phase shifters 35A to 35D and are synthesized by the signal synthesis/branching unit 36, down-converted by the mixer 38 into a baseband signal, amplified by the amplification circuit 39, and then transferred to the BBIC 2000.

When radio frequency signals are transmitted from the antenna element 10, the switches 31A to 31D and 33A to 33D are switched to the sides of the power amplifiers 32AT to 32DT, and the switch 37 is coupled to the transmission-side amplifier of the amplification circuit 39.

The baseband signal transmitted from the BBIC 2000 is amplified by the amplification circuit 39 and up-converted by the mixer 38. The up-converted radio frequency signal is caused to branch into four by the signal synthesis/branching unit 36 and pass through the respective signal paths from the phase shifters 35A to 35D to the switches 31A to 31D to be fed to the radiation electrodes 110. The directivity of the antenna element 10 can be adjusted by adjusting the degrees of the phase shift of the phase shifters 35A to 35D arranged on the signal paths, individually.

First Embodiment

Figure 2:
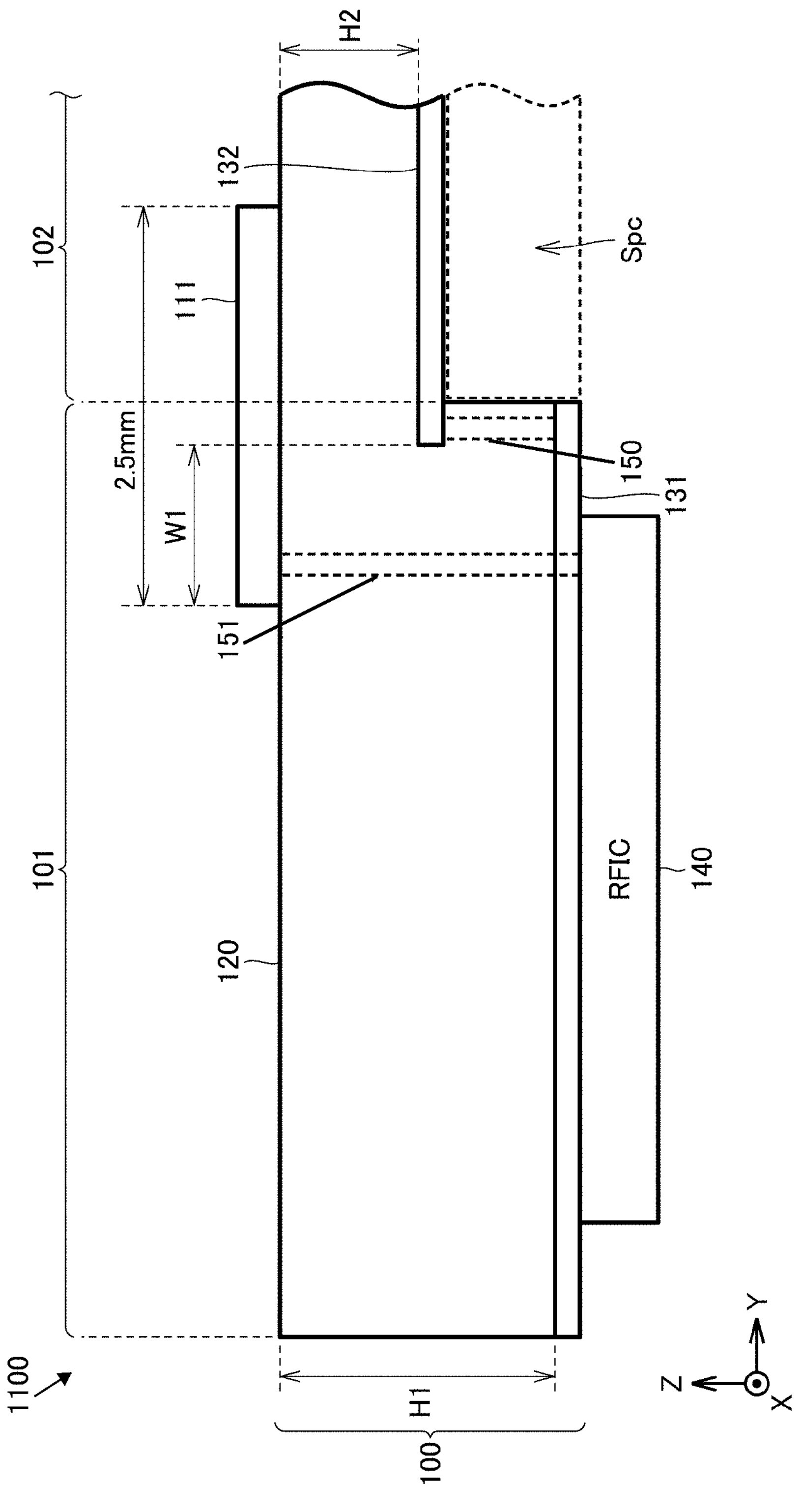
FIG. 2 illustrates an antenna module including an antenna element according to a first embodiment, which is viewed as a plane in the X axis direction.

FIG. 2 illustrates an antenna module 1100 including an antenna element 100 according to a first embodiment, which is viewed as a plane in the X axis direction. In FIG. 2, the X axis, the Y axis, and the Z axis are orthogonal to each other. The same applies to FIGS. 4, 5, and 8 to 14.

As illustrated in FIG. 2, the antenna module 1100 includes the antenna element 100 and an RFIC 140. The antenna element 100 includes a radiation electrode 111, a ground electrode 131 (a first ground electrode), a ground electrode 132 (a second ground electrode), via conductors 150 and 151, and a dielectric substrate 120. The normal direction of the radiation electrode 111 is the Z axis direction.

The dielectric substrate 120 includes a portion 101 (a first portion) shaped like a flat plate and a portion 102 (a second portion). In the Z axis direction, the portion 102 is thinner than the portion 101. The dielectric substrate 120 is formed from an integral dielectric. That is, the dielectric substrate 120 is a substrate made from a dielectric material with a certain dielectric constant so as to be integral.

The ground electrodes 131 and 132 are arranged in the portions 101 and 102, respectively. The ground electrodes 131 and 132 are coupled by the via conductor 150. The dielectric substrate 120 is formed from an integral dielectric.

The radiation electrode 111 is arranged in the portions 101 and 102 over the dielectric substrate 120 so as to lie opposite to the ground electrode 131 in the portion 101 in the thickness direction of the portion 101 (the Z axis direction) and lie opposite to the ground electrode 132 in the portion 102 in the thickness direction of the portion 102 (the Z axis direction). The distance between the radiation electrode 111 and the ground electrode 131 and the distance between the radiation electrode 111 and the ground electrode 132 in the Z axis direction are represented by H1 and H2 (=H1/2), respectively. The width of the radiation electrode 111 in the Y axis direction is 2.5 mm. Not all of the radiation electrode 111 lies opposite to the ground electrode 132 but part of the radiation electrode 111 lies opposite to the ground electrode 131 without lying opposite to the ground electrode 132. The radiation electrode 111 that lies opposite to the ground electrode 132 without lying opposite to the ground electrode 131 has a length W1 in the Y axis direction.

The via conductor 151 runs through the ground electrode 131 and couples the radiation electrode 111 and the RFIC 140. The via conductor 151 is insulated from the ground electrode 131.

The RFIC 140 supplies a radio frequency signal to the radiation electrode 111 through the via conductor 151. The RFIC 140 receives a radio frequency signal from the radiation electrode 111 through the via conductor 151.

In the portion 102, a space Spc is formed on the side where the ground electrode 132 is arranged. Since other circuit elements are arranged in the space Spc, the distance between the radiation electrode 111 and the ground electrode 132 cannot be made longer than H2.

Thus, in the first embodiment, the radiation electrode 111 is arranged so as to also lie opposite to the ground electrode 131 in addition to the ground electrode 132. The distance H1 between the radiation electrode 111 and the ground electrode 131 is longer than the distance H2. Accordingly, by causing part of the radiation electrode 111 to lie opposite to the ground electrode 131, the radiation characteristics of the antenna element 100 can be further improved in comparison with the case where all of the radiation electrode 111 lies opposite to the ground electrode 132.

Figure 3:
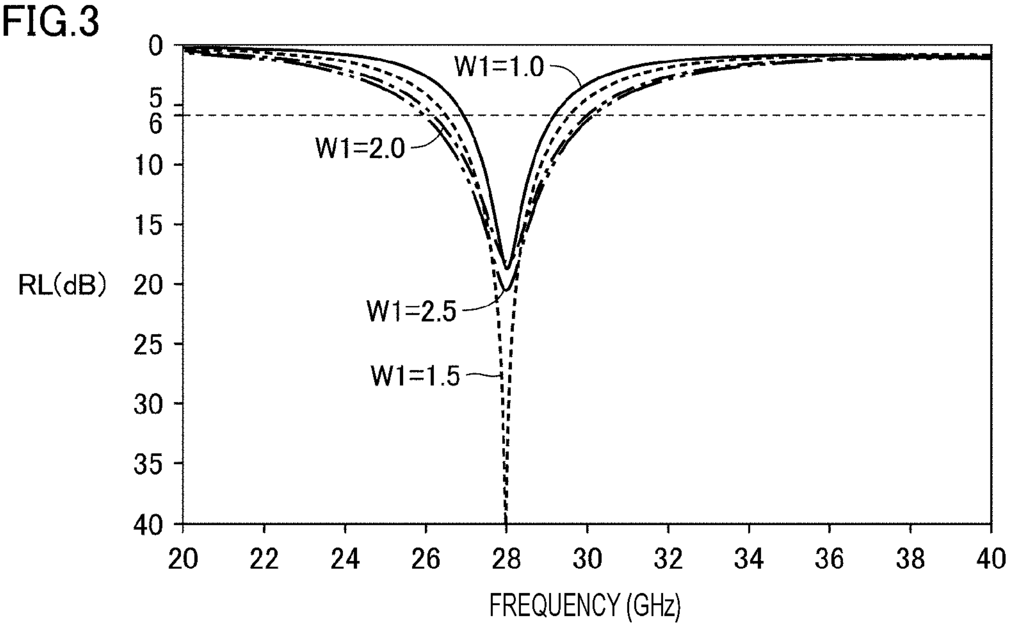
FIG. 3 is a graph indicating simulation results of the reflection characteristics of a radiation electrode obtained when a length W1 presented in FIG. 2 is changed.

FIG. 3 is a graph indicating simulation results of the reflection characteristics of the radiation electrode 111 (the relation between frequency and return loss (RL)) obtained when the length W1 presented in FIG. 2 is changed. FIG. 3 indicates the reflection characteristics in cases where the length W1 is 1.0 mm, 1.5 mm, 2.0 mm, or 2.5 mm.

It is implied that as the return loss increases, the proportion of the signals emitted outside from the radiation electrode 111 in the radio frequency signals supplied from the RFIC 140 to the radiation electrode 111 is greater. Accordingly, the band width that can bring the return loss equal to or greater than a threshold serves as one of the measures in evaluating the radiation characteristics of the antenna element 100. That is, it can be said that a larger band width makes the radiation characteristics of the antenna element 100 more favorable. Thus, in FIG. 3, while focusing attention on the band width that enables the return loss to be 6 dB or more, the radiation characteristics of the antenna element 100 are compared when the length W1 is changed.

As illustrated in FIG. 3, as the length W1 is larger, the portion of the radiation electrode 111 that lies opposite to the ground electrode 131 increases and thus, the band width that enables the return loss to be 6 dB or more is larger. That is, as the portion of the radiation electrode 111 that lies opposite to the ground electrode 131 increases, the radiation characteristics of the antenna element 100 can be further improved.

First Variation of First Embodiment

In the first embodiment, the case where the dielectric substrate is formed from an integral dielectric is described. The dielectric substrate may be made up of a plurality of dielectric layers.

Figure 4:
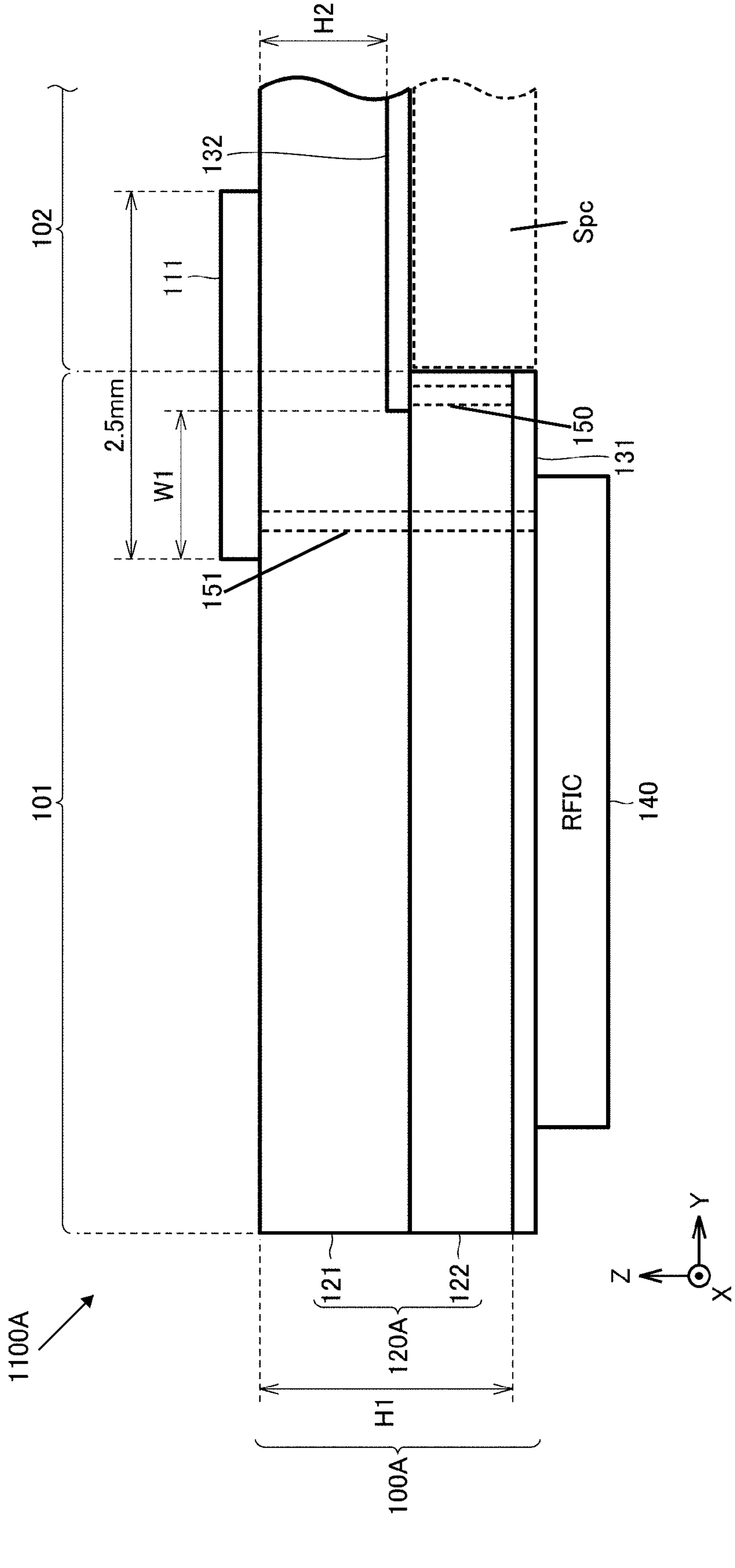
FIG. 4 illustrates an antenna module including an antenna element according to a first variation of the first embodiment, which is viewed as a plane in the X axis direction.

FIG. 4 illustrates an antenna module 1100A including an antenna element 100A according to a first variation of the first embodiment, which is viewed as a plane in the X axis direction. In the configuration of the antenna module 1100A, the antenna element 100 in FIG. 2 is replaced with the antenna element 100A. In the configuration of the antenna element 100A in FIG. 4, the dielectric substrate 120 in FIG. 2 is replaced with a dielectric substrate 120A. Since the configuration other than these is similar, the descriptions thereon are not repeated.

As illustrated in FIG. 4, the dielectric substrate 120A includes a dielectric layer 121 (a first dielectric layer) and a dielectric layer 122 (a second dielectric layer). The dielectric layer 121 is a first substrate formed from a dielectric material having a first dielectric constant. The dielectric layer 122 is a second substrate formed from a dielectric material having a second dielectric constant. The dielectric substrate 120A is the substrate made by integrating the dielectric layers 121 and 122 by welding with heat or bonding using a coupling member (e.g. a solder bump), or the like. The first dielectric constant and the second dielectric constant may be different from each other.

The dielectric layer 121 is formed in portions 101 and 102. The dielectric layer 122 is formed in the portion 101. The ground electrode 131 is arranged on the dielectric layer 122 in the portion 101. The ground electrode 132 is arranged on the dielectric layer 121 in the portion 102. The dielectric layers 121 and 122 may be welded together with heat or be bonded using a coupling member, such as a solder bump. The dielectric constant of the dielectric layer 121 may be different from the dielectric constant of the dielectric layer 122.

Second Variation of First Embodiment

In each of the first embodiment and the first variation thereof, the antenna element that includes one radiation electrode is described. The number of radiation electrodes may be two or more. In a second variation of the first embodiment, an antenna element that includes two radiation electrodes is described.

Figure 5:
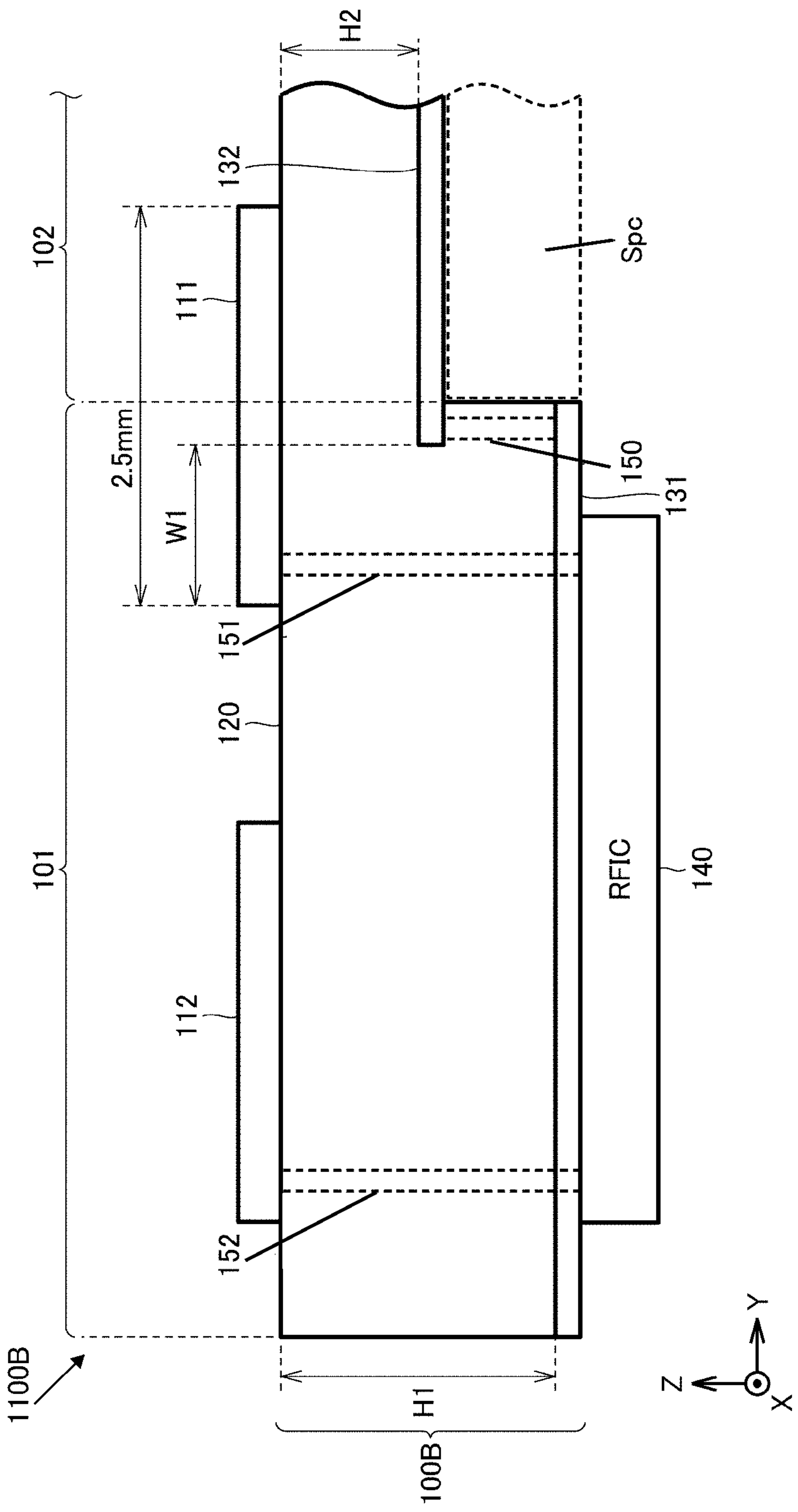
FIG. 5 illustrates an antenna module including an antenna element according to a second variation of the first embodiment, which is viewed as a plane in the X axis direction.

FIG. 5 illustrates an antenna module 1100B including an antenna element 100B according to the second variation of the first embodiment, which is viewed as a plane in the X axis direction. In the configuration of the antenna module 1100B, the antenna element 100 in FIG. 2 is replaced with the antenna element 100B. In the configuration of the antenna element 100B in FIG. 5, a radiation electrode 112 and a via conductor 152 are added to the antenna element 100 in FIG. 2. Since the configuration other than these is similar, the descriptions thereon are not repeated.

As illustrated in FIG. 5, the radiation electrode 112 is arranged away from the radiation electrode 111 in the portion 101. The via conductor 152 runs through the ground electrode 131 and couples the radiation electrode 112 and the RFIC 140. The via conductor 152 is insulated from the ground electrode 131.

The RFIC 140 supplies a radio frequency signal to the radiation electrode 112 through the via conductor 152. The RFIC 140 receives a radio frequency signal from the radiation electrode 112 through the via conductor 152.

Figure 6:
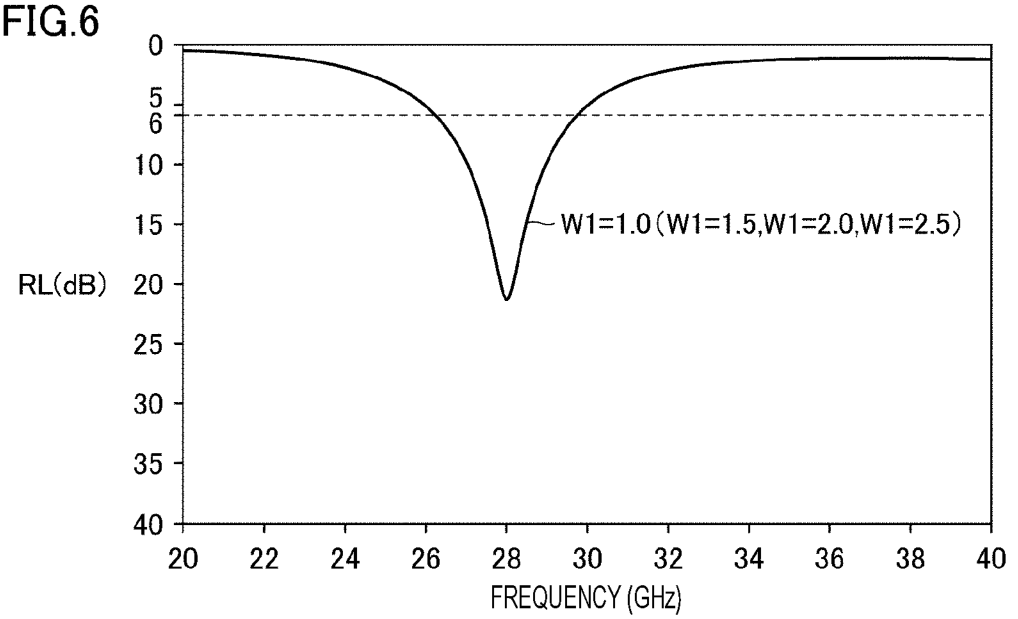
FIG. 6 is a graph indicating simulation results of the reflection characteristics of a radiation electrode obtained when a length W1 presented in FIG. 5 is changed.

FIG. 6 is a graph indicating simulation results of the reflection characteristics of the radiation electrode 112 obtained when the length W1 presented in FIG. 5 is changed. FIG. 6 indicates the reflection characteristics in cases where the length W1 is 1.0 mm, 1.50 mm, 2.0 mm, or 2.5 mm. Since the respective reflection characteristics of the cases exhibit almost the same way of variation, the reflection characteristics are drawn as an identical curve in FIG. 6. That is, the length W1 has little effect on the reflection characteristics of the radiation electrode 112.

Figure 7:
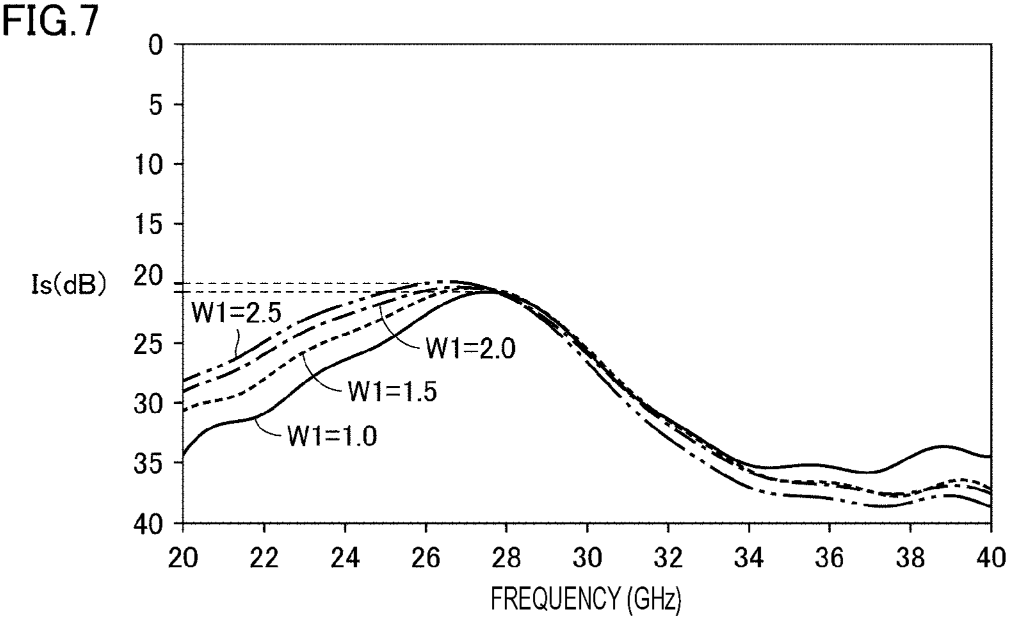
FIG. 7 is a graph indicating simulation results of the isolation characteristics of two radiation electrodes obtained when the length W1 presented in FIG. 5 is changed.

FIG. 7 is a graph indicating simulation results of the isolation characteristics of the two radiation electrodes 111 and 112 (the relation between isolation and frequency) obtained when the length W1 is changed. FIG. 7 indicates the isolation characteristics in cases where the length W1 is 1.0 mm, 1.5 mm, 2.0 mm, or 2.5 mm.

The isolation of the two radiation electrodes is a measure indicating how the two radiation electrodes are separated. That is, in the signals that are inputted from one of the radiation electrodes, the proportion of the signals that are not outputted from the other radiation electrode is greater as the isolation between the two radiation electrodes increases.

In the frequency band indicated in FIG. 7, the respective minimum values of the isolation characteristics are within a range of about 1 dB. That is, the length W1 has little effect on the isolation characteristics of the radiation electrodes 111 and 112.

Thus, the antenna elements according to the first embodiment and the first variation and the second variation thereof enable it to improve the radiation characteristics.

Second Embodiment

In a second embodiment, a case where a dielectric substrate of an antenna element is bent is described.

Figure 8:
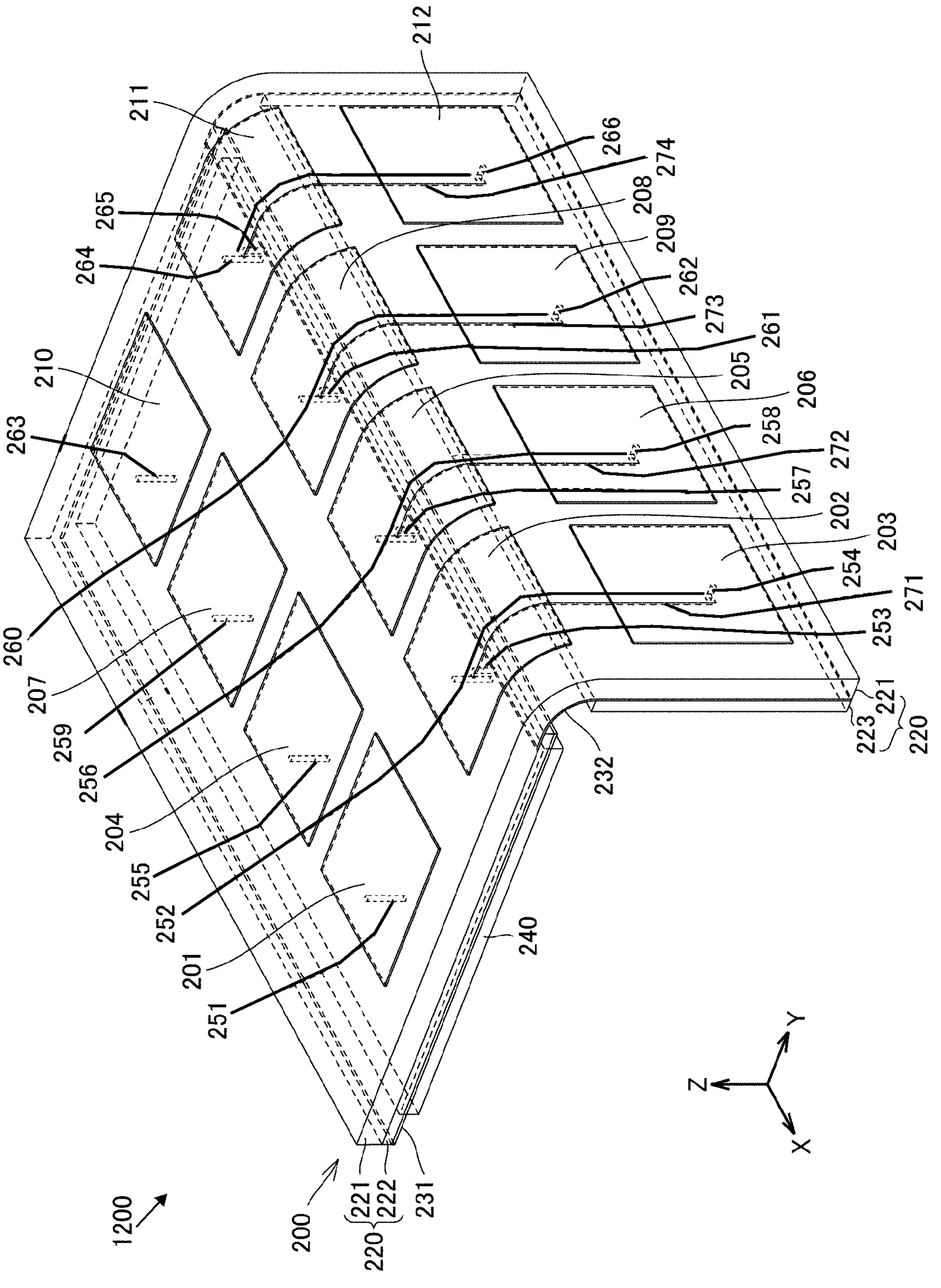
FIG. 8 is a perspective view of the external appearance of an antenna module including an antenna element according to a second embodiment.
Figure 9:
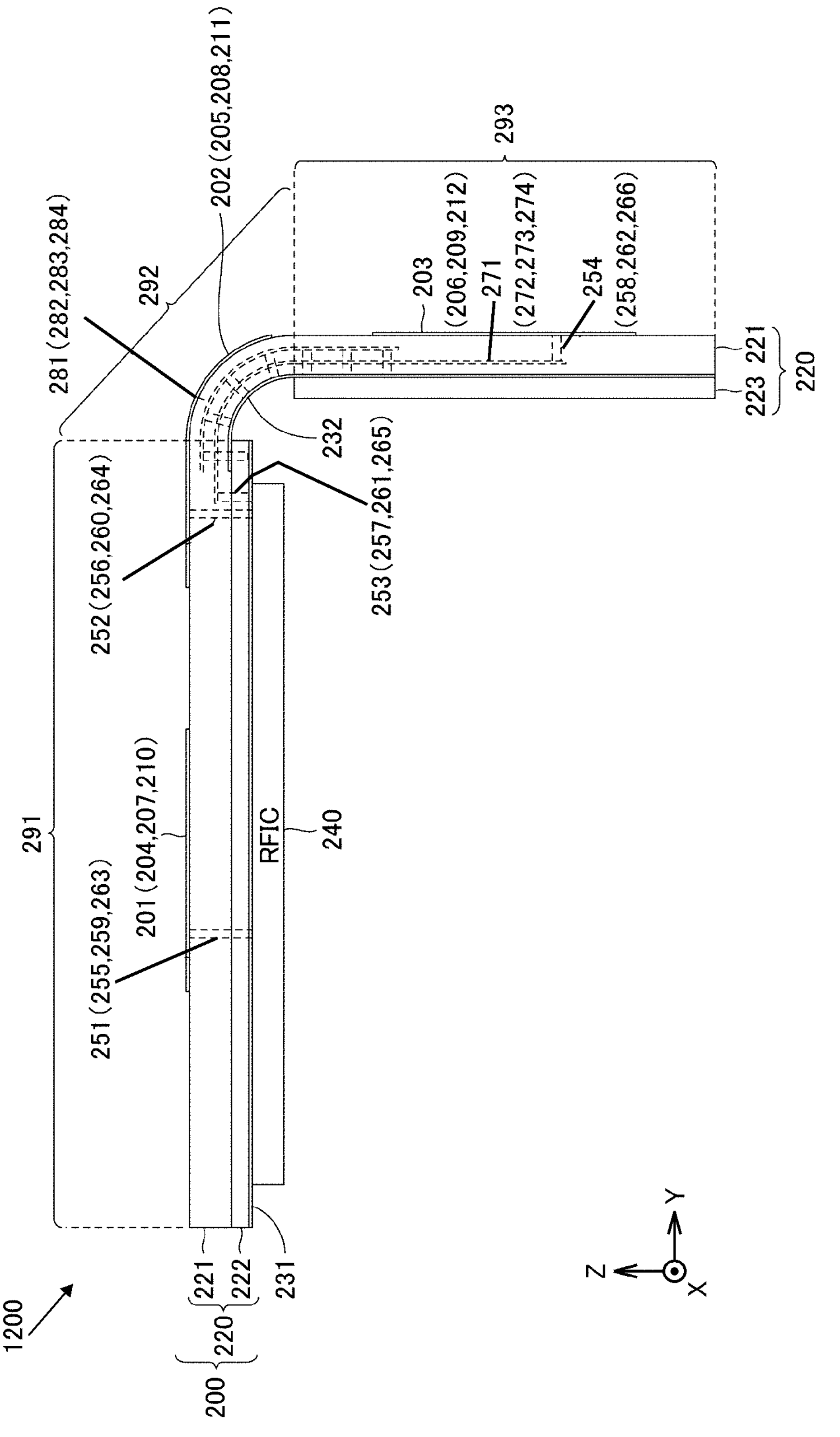
FIG. 9 illustrates the antenna module in FIG. 8, which is viewed as a plane in the X axis direction.

FIG. 8 is a perspective view of the external appearance of an antenna module 1200 including an antenna element 200 according to the second embodiment. FIG. 9 illustrates the antenna module 1200 in FIG. 8, which is viewed as a plane in the X axis direction. In FIG. 8, to increase the viewability of the coupling relations among the constituents, ground electrodes 281 to 284 illustrated in FIG. 9 and a plurality of via conductors coupled to the ground electrodes 281 to 284 are not illustrated.

As illustrated in FIGS. 8 and 9, the antenna module 1200 includes the antenna element 200 and an RFIC 240. The antenna element 200 includes radiation electrodes 201 to 212, a dielectric substrate 220, a ground electrode 231 (a first ground electrode), a ground electrode 232 (a second ground electrode), via conductors 251 to 266, line conductor patterns 271 to 274, and the ground electrodes 281 to 284.

The dielectric substrate 220 includes a portion 291 (a first portion) shaped like a flat plate, a portion 292 (a second portion), and a portion 293 shaped like a flat plate. The portion 292 is thinner than the portions 291 and 293. The dielectric substrate 220 is bent in the portion 292.

The dielectric substrate 220 includes a dielectric layer 221 (a first dielectric layer), a dielectric layer 222 (a second dielectric layer), and a dielectric layer 223. The dielectric layer 221 is formed in the portions 291 to 293. The dielectric layer 221 is formed from a material having flexibility (a flexible material). The dielectric layer 221 is bent in the portion 292. The dielectric layer 222 is formed in the portion 291. The dielectric layer 223 is formed in the portion 293. The dielectric substrate 220 may be formed from an integral dielectric.

The radiation electrodes 201, 204, 207, and 210 are arranged so as to be along the X axis in the portion 291. The normal direction of the radiation electrodes 201, 204, 207, and 210 is the Z axis direction.

The ground electrode 231 is arranged on the dielectric layer 222 so as to lie opposite to each of the radiation electrodes 201, 204, 207, and 210 in the Z axis direction.

The via conductors 251, 255, 259, and 263 run through the ground electrode 231 and couple the radiation electrode 201 and the RFIC 240, the radiation electrode 204 and the RFIC 240, the radiation electrode 207 and the RFIC 240, and the radiation electrode 210 and the RFIC 240, respectively. The via conductors 251, 255, 259, and 263 are insulated from the ground electrode 231.

The RFIC 240 supplies radio frequency signals to the radiation electrodes 201, 204, 207, and 210 through the via conductors 251, 255, 259, and 263, respectively. The RFIC 240 receives radio frequency signals from the radiation electrodes 201, 204, 207, and 210 through the via conductors 251, 255, 259, and 263, respectively.

The radiation electrodes 203, 206, 209, and 212 are arranged so as to be along the X axis in the portion 293. The normal direction of the radiation electrodes 203, 206, 209, and 212 is the Y axis direction.

The ground electrode 232 is formed on the dielectric layer 221 in the portions 291 to 293. The ground electrode 232 lies opposite to the radiation electrodes 203, 206, 209, and 212 in the Y axis direction. The ground electrode 232 is coupled to the ground electrode 231.

The ground electrodes 281 to 284 are formed in the portions 291 to 293 and arranged in the dielectric layer 221 so as to be along the X axis. The ground electrodes 281 to 284 are coupled to the ground electrode 232 by a plurality of via conductors.

The radiation electrodes 202, 205, 208, and 211 are formed in the portions 291 and 292 and arranged so as to be along the X axis. In the portion 291, the radiation electrodes 202, 205, 208, and 211 lie opposite to the ground electrode 231 in the Z axis direction. In the portion 292, the radiation electrodes 202, 205, 208, and 211 lie opposite to the ground electrode 232 in the thickness direction of the portion 292. The distance between the radiation electrodes 202, 205, 208, and 211 and the ground electrode 231 in the Z axis direction is more than the distance between the radiation electrodes 202, 205, 208, and 211 and the ground electrode 232 in the thickness direction of the portion 292. In the antenna module 1200, part of each of the radiation electrodes 202, 205, 208, and 211 lies opposite to the ground electrode 231 without lying opposite to the ground electrode 232 in the portion 291.

The via conductors 252, 256, 260, and 264 run through the ground electrode 231 and couple the radiation electrode 202 and the RFIC 240, the radiation electrode 205 and the RFIC 240, the radiation electrode 208 and the RFIC 240, and the radiation electrode 211 and the RFIC 240, respectively. The via conductors 252, 256, 260, and 264 are insulated from the ground electrode 231.

The line conductor patterns 271 to 274 are formed in the dielectric layer 221 in the portions 291 to 293. The line conductor pattern 271 is formed between the ground electrodes 232 and 281. The line conductor pattern 272 is formed between the ground electrodes 232 and 282. The line conductor pattern 273 is formed between the ground electrodes 232 and 283. The line conductor pattern 274 is formed between the ground electrodes 232 and 284.

The via conductors 253, 257, 261, and 265 run through the ground electrode 231 and couple the line conductor pattern 271 and the RFIC 240, the line conductor pattern 272 and the RFIC 240, the line conductor pattern 273 and the RFIC 240, and the line conductor pattern 274 and the RFIC 240, respectively. The via conductors 253, 257, 261, and 265 are insulated from the ground electrode 231.

The via conductor 254 couples the line conductor pattern 271 and the radiation electrode 203. The via conductor 258 couples the line conductor pattern 272 and the radiation electrode 206. The via conductor 262 couples the line conductor pattern 273 and the radiation electrode 209. The via conductor 266 couples the line conductor pattern 274 and the radiation electrode 212.

The RFIC 240 supplies radio frequency signals to the radiation electrodes 203, 206, 209, and 212 through the line conductor patterns 271 to 274, respectively. The RFIC 240 receives radio frequency signals from the radiation electrodes 203, 206, 209, and 212 through the line conductor patterns 271 to 274, respectively.

In the antenna element 200, the dielectric substrate 220 is bent in the portion 292 and accordingly, the normal direction of the radiation electrodes 201, 204, 207, and 210 (which is the Z axis direction), the normal direction of the radiation electrodes 202, 205, 208, and 211 (which is the thickness direction of the portion 292), and the normal direction of the radiation electrodes 203, 206, 209, and 212 (which is the Y axis direction) are different from one another. In the antenna module 1200, radio frequency signals with polarized waves different in excitation direction can be transmitted and received more easily in comparison with the case where the normals of a plurality of radiation electrodes are parallel.

Further, in the antenna element 200, the dielectric layer 221 is formed from a flexible material and therefore the stress caused in the portion 292 that is bent can be reduced. Accordingly, in the portions 291 and 293, the evenness of a surface of the dielectric substrate 220 can be maintained. Thus, the deviation of the normal directions of the radiation electrodes 201 to 212 from desired directions can be inhibited. As a result, the decrease in the characteristics of the antenna element 200 caused by bending the dielectric substrate 220 can be inhibited.

First Variation of Second Embodiment

In the antenna module 1200, part of each of the radiation electrodes 202, 205, 208, and 211 lies opposite to the ground electrode 231 and the RFIC 240 without lying opposite to the ground electrode 232 in the portion 291. The RFIC 240 need not be arranged in the portion 291. In a variation of the second embodiment, a configuration where the RFIC 240 is arranged in the portion 293 is described.

Figure 10:
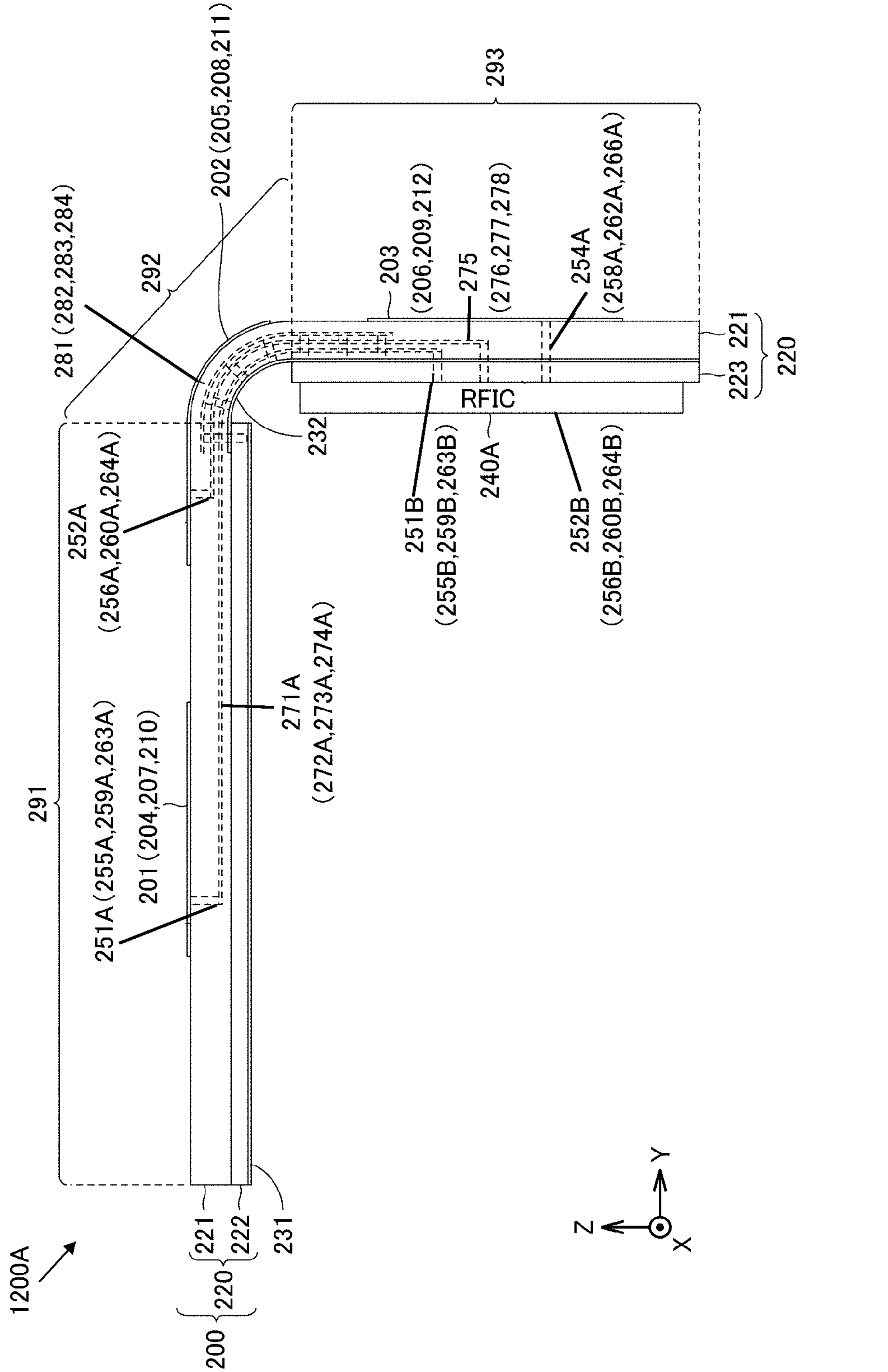
FIG. 10 illustrates an antenna module according to a first variation of the second embodiment, which is viewed as a plane in the X axis direction.

FIG. 10 illustrates an antenna module 1200A according to a first variation of the second embodiment, which is viewed as a plane in the X axis direction. In the antenna module 1200A, the via conductors 253, 257, 261, and 265 and the line conductor patterns 271 to 274 are removed from the configuration of the antenna module 1200 in FIG. 9. In the antenna module 1200A, the via conductors 251, 255, 259, and 263 of the antenna module 1200 in FIG. 9 are replaced with via conductors 251A, 255A, 259A, and 263A, respectively. In the antenna module 1200A, the via conductors 252, 256, 260, and 264 of the antenna module 1200 in FIG. 9 are replaced with via conductors 252A, 256A, 260A, and 264A, respectively. In the antenna module 1200A, the via conductors 254, 258, 262, and 266 of the antenna module 1200 in FIG. 9 are replaced with via conductors 254A, 258A, 262A, and 266A, respectively. In the antenna module 1200A, the RFIC 240 is replaced with an RFIC 240A. In the antenna module 1200A, line conductor patterns 271A to 274A and 275 to 278, via conductors 251B, 255B, 259B, and 263B, and via conductors 252B, 256B, 260B, and 264B are added. Since the configuration other than these is similar, the descriptions thereon are not repeated.

As illustrated in FIG. 10, the RFIC 240A is arranged on the dielectric layer 223 in the portion 293 so as to lie opposite to the ground electrode 232.

The line conductor patterns 271A to 274A are formed in the dielectric layer 221 in the portions 291 to 293. The line conductor pattern 271A is formed between the ground electrodes 232 and 281. The line conductor pattern 272A is formed between the ground electrodes 232 and 282. The line conductor pattern 273A is formed between the ground electrodes 232 and 283. The line conductor pattern 274A is formed between the ground electrodes 232 and 284.

The via conductor 251A couples the line conductor pattern 271A and the radiation electrode 201. The via conductor 255A couples the line conductor pattern 272A and the radiation electrode 204. The via conductor 259A couples the line conductor pattern 273A and the radiation electrode 207. The via conductor 263A couples the line conductor pattern 274A and the radiation electrode 210.

The via conductors 251B, 255B, 259B, and 263B run through the ground electrode 232 and couple the line conductor pattern 271A and the RFIC 240A, the line conductor pattern 272A and the RFIC 240A, the line conductor pattern 273A and the RFIC 240A, and the line conductor pattern 274A and the RFIC 240A, respectively. The via conductors 251B, 255B, 259B, and 263B are insulated from the ground electrode 232.

The RFIC 240A supplies radio frequency signals to the radiation electrodes 201, 204, 207, and 210 through the line conductor patterns 271A to 274A, respectively. The RFIC 240A receives radio frequency signals from the radiation electrodes 201, 204, 207, and 210 through the line conductor patterns 271A to 274A, respectively.

The line conductor patterns 275 to 278 are formed in the dielectric layer 221 in the portions 291 to 293. The line conductor pattern 275 is formed between the ground electrodes 232 and 281. The line conductor pattern 276 is formed between the ground electrodes 232 and 282. The line conductor pattern 277 is formed between the ground electrodes 232 and 283. The line conductor pattern 278 is formed between the ground electrodes 232 and 284.

The via conductor 252A couples the line conductor pattern 275 and the radiation electrode 202. The via conductor 256A couples the line conductor pattern 276 and the radiation electrode 205. The via conductor 260A couples the line conductor pattern 277 and the radiation electrode 208. The via conductor 264A couples the line conductor pattern 278 and the radiation electrode 211.

The via conductors 252B, 256B, 260B, and 264B run through the ground electrode 232 and couple the line conductor pattern 275 and the RFIC 240A, the line conductor pattern 276 and the RFIC 240A, the line conductor pattern 277 and the RFIC 240A, and the line conductor pattern 278 and the RFIC 240A, respectively. The via conductors 252B, 256B, 260B, and 264B are insulated from the ground electrode 232.

The RFIC 240A supplies radio frequency signals to the radiation electrodes 202, 205, 208, and 211 through the line conductor patterns 275 to 278, respectively. The RFIC 240A receives radio frequency signals from the radiation electrodes 202, 205, 208, and 211 through the line conductor patterns 275 to 278, respectively.

The via conductors 254A, 258A, 262A, and 266A run through the ground electrode 232 and couple the radiation electrode 203 and the RFIC 240A, the radiation electrode 206 and the RFIC 240A, the radiation electrode 209 and the RFIC 240A, and the radiation electrode 212 and the RFIC 240A, respectively. The via conductors 254A, 258A, 262A, and 266A are insulated from the ground electrode 232.

The RFIC 240A supplies radio frequency signals to the radiation electrodes 203, 206, 209, and 212 through the via conductors 254A, 258A, 262A, and 266A, respectively. The RFIC 240A receives radio frequency signals from the radiation electrodes 203, 206, 209, and 212 through the via conductors 254A, 258A, 262A, and 266A, respectively.

Second Variation of Second Embodiment

In each of the second embodiment and the first variation thereof, the case where the dielectric substrate of the antenna element includes one bent portion is described. The dielectric substrate may include a plurality of bent portions. In a second variation of the second embodiment, the dielectric substrate includes two bent portions is described.

Figure 11:
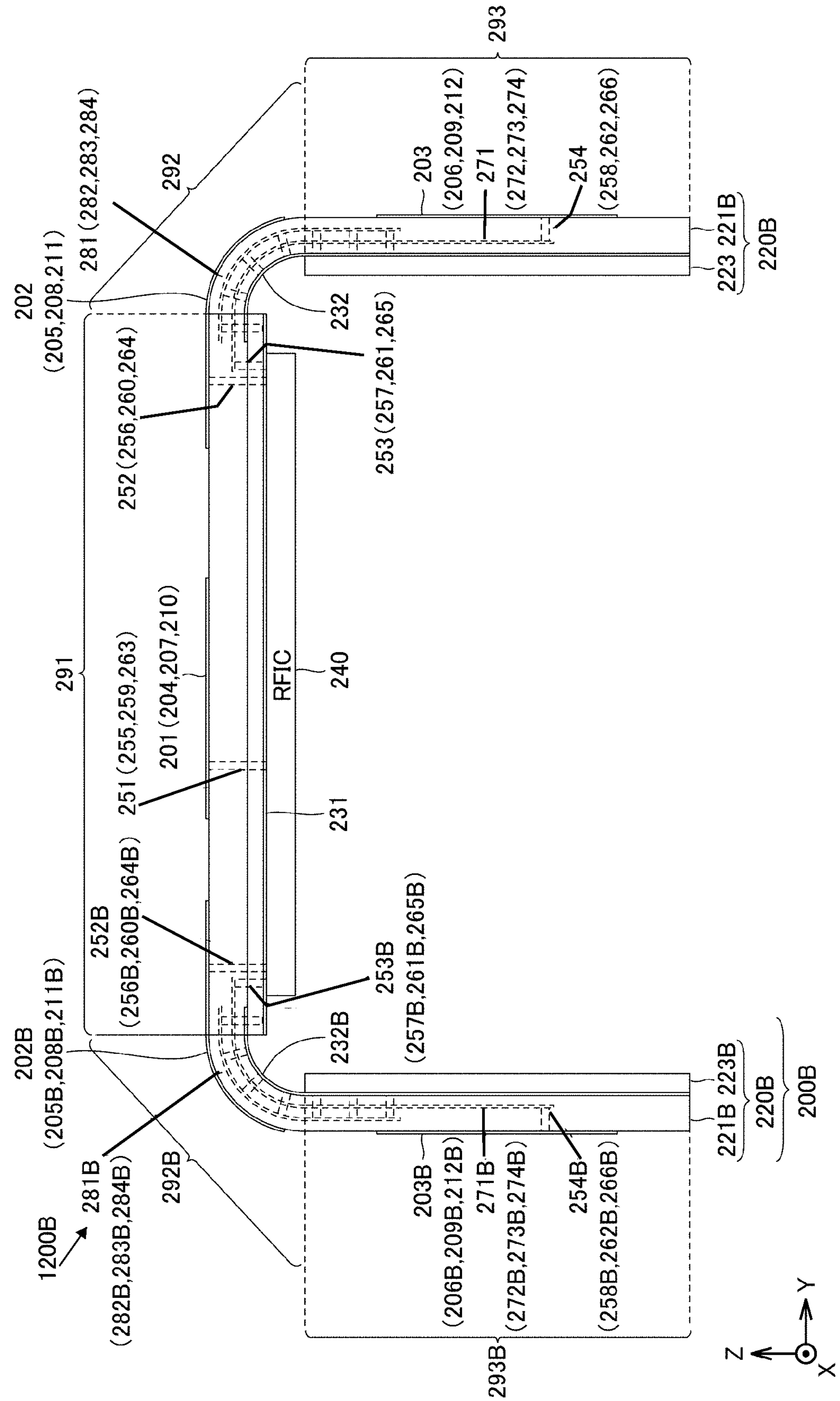
FIG. 11 illustrates an antenna module according to a second variation of the second embodiment, which is viewed as a plane in the X axis direction.

FIG. 11 illustrates an antenna module 1200B according to the second variation of the second embodiment, which is viewed as a plane in the X axis direction. In the configuration of the antenna module 1200B, the antenna element 200 of the antenna module 1200 in FIG. 9 is replaced with an antenna element 200B. In the configuration of the antenna element 200B, the dielectric substrate 220 is replaced with a dielectric substrate 220B while radiation electrodes 202B, 205B, 208B, and 211B, radiation electrodes 203B, 206B, 209B, and 212B, ground electrodes 232B and 281B to 284B, via conductors 252B, 256B, 260B, and 264B, via conductors 253B, 257B, 261B, and 265B, via conductors 254B, 258B, 262B, and 266B, and line conductor patterns 271B to 274B are added. In the configuration of the dielectric substrate 220B, the dielectric layer 221 of the dielectric substrate 220 is replaced with a dielectric layer 221B while portions 292B and 293B and a dielectric layer 223B are added to the dielectric substrate 220. Since the configuration other than these is similar, the descriptions thereon are not repeated.

As illustrated in FIG. 11, the portion 293B is shaped like a flat plate. The portion 292B is thinner than the portions 291 and 293B. In the dielectric substrate 220B, the portion 292B couples the portion 291 extending in the Y axis direction and the portion 293B extending in the Z axis direction.

The dielectric layer 221B is formed from a material having flexibility (a flexible material). The dielectric substrate 220B is bent not only in the portion 292 but also in the portion 292B (a second portion). The dielectric layer 223B is formed in the portion 293B. The dielectric substrate 220B may be formed from an integral dielectric.

The radiation electrodes 203B, 206B, 209B, and 212B are arranged in the portion 293B so as to be along the X axis. The normal direction of the radiation electrodes 203B, 206B, 209B, and 212B is the Y axis direction.

The ground electrode 232B is formed on the dielectric layer 221B in the portions 291, 292B, and 293B. The ground electrode 232B lies opposite to the radiation electrodes 203B, 206B, 209B, and 212B in the Y axis direction. The ground electrode 232B is coupled to the ground electrode 231B.

The ground electrodes 281B to 284B are formed in the portions 291, 292B, and 293B and arranged in the dielectric layer 221B so as to be along the X axis. The ground electrodes 281B to 284B are coupled to the ground electrode 232B by a plurality of via conductors.

The radiation electrodes 202B, 205B, 208B, and 211B are formed in the portions 291 and 292B and arranged so as to be along the X axis. In the portion 291, the radiation electrodes 202B, 205B, 208B, and 211B lie opposite to the ground electrode 231 in the Z axis direction. In the portion 292B, the radiation electrodes 202B, 205B, 208B, and 211B lie opposite to the ground electrode 232B in the thickness direction of the portion 292B. The distance between the radiation electrodes 202B, 205B, 208B, and 211B and the ground electrode 231 in the Z axis direction is more than the distance between the radiation electrodes 202B, 205B, 208B, and 211B and the ground electrode 232B in the thickness direction of the portion 292B. In the antenna module 1200B, part of each of the radiation electrodes 202B, 205B, 208B, and 211B lies opposite to the ground electrode 231 without lying opposite to the ground electrode 232B in the portion 291.

The via conductors 252B, 256B, 260B, and 264B run through the ground electrode 231 and couple the radiation electrode 202B and the RFIC 240, the radiation electrode 205B and the RFIC 240, the radiation electrode 208B and the RFIC 240, and the radiation electrode 211B and the RFIC 240, respectively. The via conductors 252B, 256B, 260B, and 264B are insulated from the ground electrode 231.

The line conductor patterns 271B to 274B are formed in the dielectric layer 221B in the portions 291, 292B, and 293B. The line conductor pattern 271B is formed between the ground electrodes 232B and 281B. The line conductor pattern 272B is formed between the ground electrodes 232B and 282B. The line conductor pattern 273B is formed between the ground electrodes 232B and 283B. The line conductor pattern 274B is formed between the ground electrodes 232B and 284B.

The via conductors 253B, 257B, 261B, and 265B run through the ground electrode 231 and couple the line conductor pattern 271B and the RFIC 240, the line conductor pattern 272B and the RFIC 240, the line conductor pattern 273B and the RFIC 240, and the line conductor pattern 274B and the RFIC 240, respectively. The via conductors 253B, 257B, 261B, and 265B are insulated from the ground electrode 231.

The via conductor 254B couples the line conductor pattern 271B and the radiation electrode 203B. The via conductor 258B couples the line conductor pattern 272B and the radiation electrode 206B. The via conductor 262B couples the line conductor pattern 273B and the radiation electrode 209B. The via conductor 266B couples the line conductor pattern 274B and the radiation electrode 212B.

The RFIC 240 supplies radio frequency signals to the radiation electrodes 203B, 206B, 209B, and 212B through the line conductor patterns 271B to 274B, respectively. The RFIC 240 receives radio frequency signals from the radiation electrodes 203B, 206B, 209B, and 212B through the line conductor patterns 271B to 274B, respectively.

In the antenna element 200B, the dielectric substrate 220B is bent in the portions 292 and 292B and accordingly, the normal direction of the radiation electrodes 201, 204, 207, and 210 (which is the Z axis direction), the normal direction of the radiation electrodes 202, 205, 208, and 211 (which is the thickness direction of the portion 292), the normal direction of the radiation electrodes 203, 206, 209, 212, 203B, 206B, 209B, and 212B (which is the Y axis direction), and the normal direction of the radiation electrodes 202B, 205B, 208B, and 211B (which is the thickness direction of the portion 292B) are different from one another. In the antenna module 1200B, radio frequency signals with polarized waves different in excitation direction can be transmitted and received more easily in comparison with the case where the normals of a plurality of radiation electrodes are parallel.

Further, in the antenna element 200B, the dielectric layer 221B is formed from a flexible material and therefore the stress caused in the portions 292 and 292B that are bent can be reduced. Accordingly, in the portions 291, 293, and 293B, the evenness of a surface of the dielectric substrate 220B can be maintained. Thus, the deviation of the normal directions of the radiation electrodes 201 to 212, the radiation electrodes 202B, 205B, 208B, and 211B, and the radiation electrodes 203B, 206B, 209B, and 212B from desired directions can be inhibited. As a result, the decrease in the characteristics of the antenna element 200B caused by bending the dielectric substrate 220B can be inhibited.

Thus, the antenna elements according to the second embodiment and the first variation and the second variation thereof enable it to improve the radiation characteristics.

Third Embodiment

In a third embodiment, a communication device including the antenna element according to the second embodiment is described.

Figure 12:
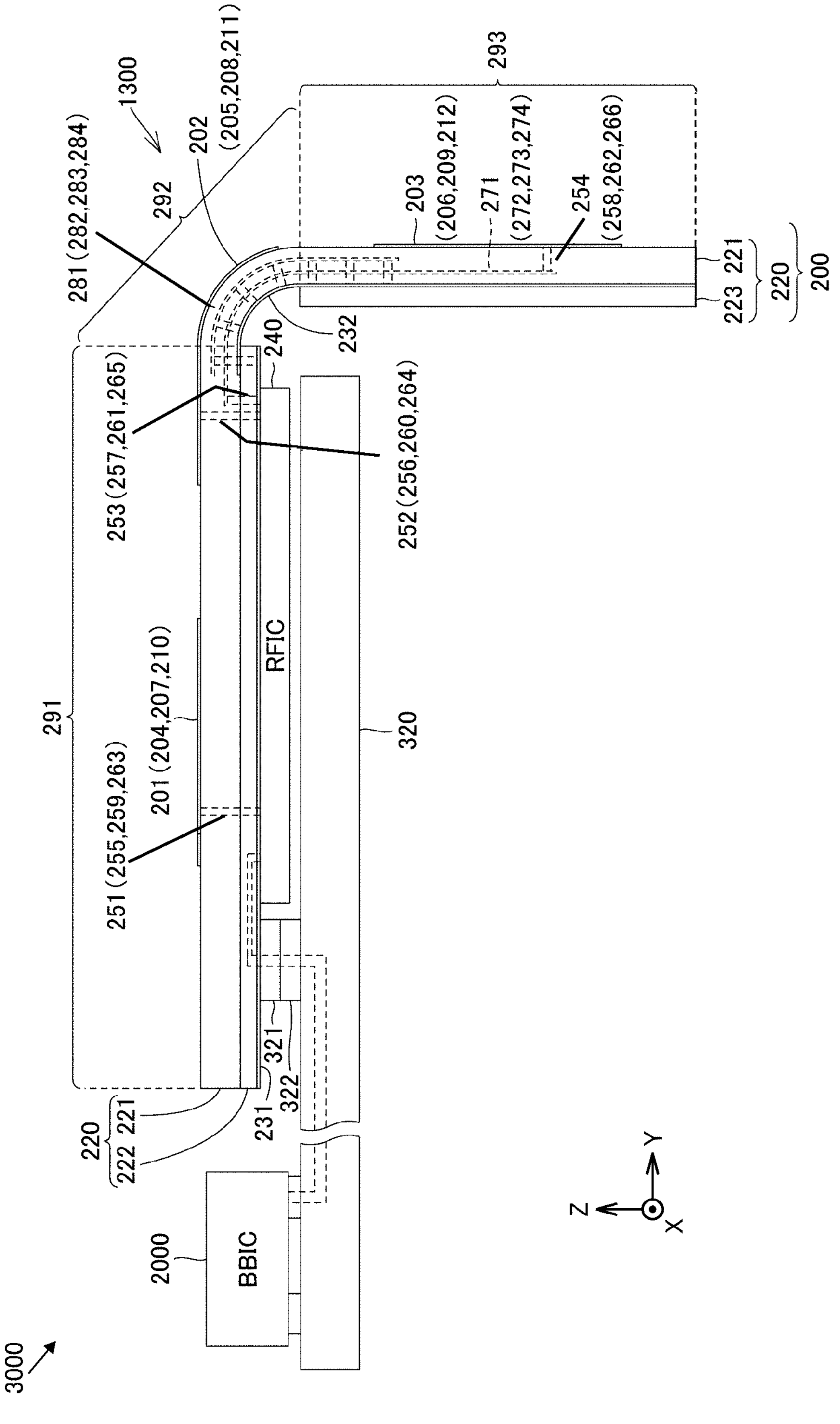
FIG. 12 illustrates a communication device according to a third embodiment, which is viewed as a plane in the X axis direction.

FIG. 12 illustrates a communication device 3000 according to the third embodiment, which is viewed as a plane in the X axis direction. As illustrated in FIG. 12, the communication device 3000 includes a BBIC 2000, an antenna module 1300, and a mounting board 320. In the configuration of the antenna module 1300, a connector 321 is added to the antenna module 1200 illustrated in FIG. 9. Since the configuration other than this is similar, the descriptions thereon are not repeated.

As illustrated in FIG. 12, the connector 321 is arranged on the dielectric layer 222 in the portion 291. The connector 321 is coupled to the RFIC 240 by feeding wiring formed in the dielectric layer 222. A connector 322 is arranged on the mounting board 320. The connector 322 is coupled to the connector 321 so as to be attachable and removable.

The BBIC 2000 is arranged on a surface of the mounting board 320 using a coupling member, such as a solder bump. The BBIC 2000 is coupled to the connector 322 by feeding wiring formed inside the mounting board 320. The BBIC 2000 transmits a baseband signal to the RFIC 240 and receives a baseband signal from the RFIC 240 through the feeding wiring and the connector 322. The BBIC 2000 and the RFIC 240 can be coupled from a longer distance by routing flexible printed circuits (FPCs).

First Variation of Third Embodiment

Figure 13:
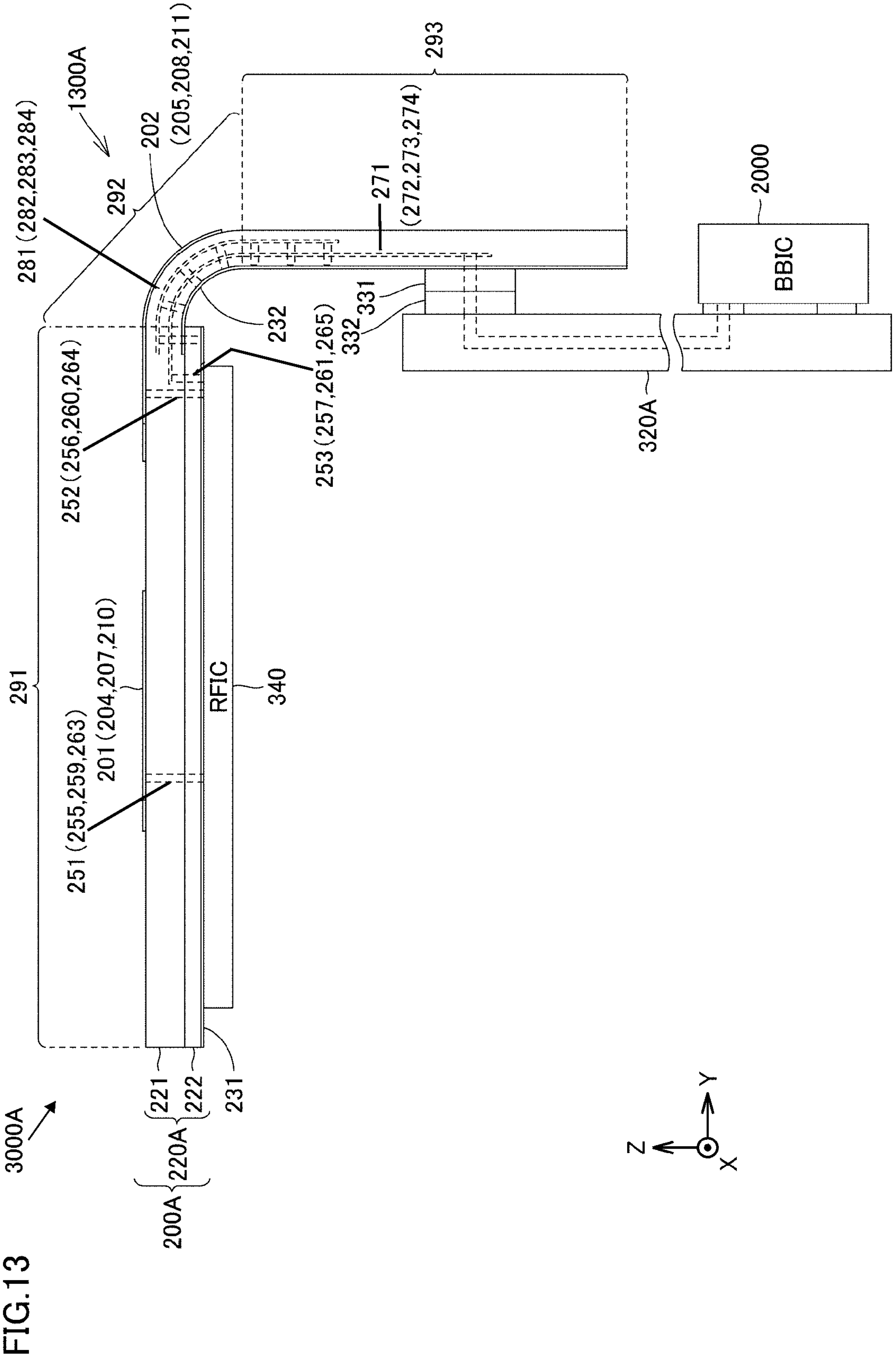
FIG. 13 illustrates a communication device according to a first variation of the third embodiment, which is viewed as a plane in the X axis direction.

FIG. 13 illustrates a communication device 3000A according to a first variation of the third embodiment, which is viewed as a plane in the X axis direction. As illustrated in FIG. 13, the communication device 3000A includes the BBIC 2000, an antenna module 1300A, and a mounting board 320A. In the configuration of the antenna module 1300A, the antenna element 200 of the antenna module 1200 in FIG. 9 is replaced with an antenna element 200A. In the configuration of the antenna element 200A in FIG. 13, the radiation electrodes 203, 206, 209, and 212, the via conductors 254, 258, 262, and 266, and the dielectric layer 223 are removed from the antenna element 200 in FIG. 9 while a connector 331 is added. Since the configuration other than these is similar, the descriptions thereon are not repeated.

As illustrated in FIG. 13, the connector 331 is arranged toward the dielectric layer 221 in the portion 293. The connector 331 is coupled to the line conductor patterns 271 to 274. The BBIC 2000 is arranged on a surface of the mounting board 320A using a coupling member, such as a solder bump. A connector 332 is arranged on the mounting board 320A. The connector 332 is coupled to the connector 331 so as to be attachable and removable.

The BBIC 2000 is coupled to the connector 332 by feeding wiring formed in the mounting board 320A. The BBIC 2000 transmits a baseband signal to the RFIC 240 and receives a baseband signal from the RFIC 240 through the feeding wiring, the connectors 332 and 331, the line conductor patterns 271 to 274, and the via conductors 253, 257, 261, and 265.

Second Variation of Third Embodiment

In each of the third embodiment and the first variation thereof, the configuration where a dielectric layer that is included in the plurality of dielectric layers making up the antenna element and is formed from a flexible material includes one bent portion is described. Described in a second variation of the third embodiment is a configuration where the dielectric layer includes two bent portions and bends so as to be wound around an end portion of the mounting board.

Figure 14:
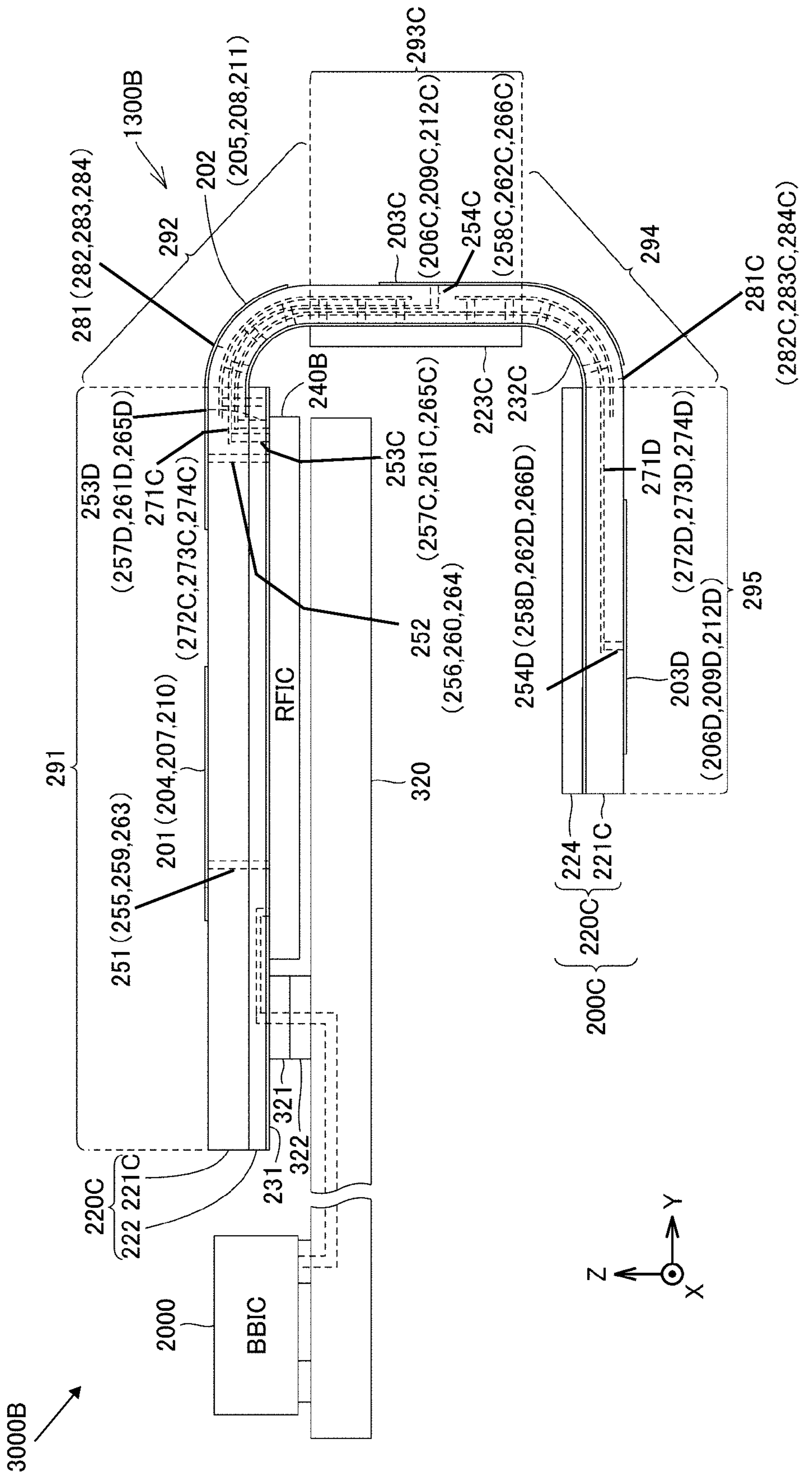
FIG. 14 illustrates a communication device according to a second variation of the third embodiment, which is viewed as a plane in the X axis direction.

FIG. 14 illustrates a communication device 3000B according to the second variation of the third embodiment, which is viewed as a plane in the X axis direction. In the configuration of the communication device 3000B, the antenna module 1300 of the communication device 3000 in FIG. 12 is replaced with an antenna module 1300B. In the configuration of the antenna module 1300B, the antenna element 200 and the RFIC 240 of the antenna module 1300 are replaced with an antenna element 200C and an RFIC 240B.

In the antenna element 200C, the radiation electrodes 203, 206, 209, and 212, the dielectric substrate 220, the line conductor patterns 271 to 274, the ground electrode 232, the via conductors 253, 257, 261, and 265, and the via conductors 254, 258, 262, and 266 of the antenna element 200 are replaced with radiation electrodes 203C, 206C, 209C, and 212C, a dielectric substrate 220C, line conductor patterns 271C to 274C, a ground electrode 232C, via conductors 253C, 257C, 261C, and 265C, and via conductors 254C, 258C, 262C, and 266C, respectively. Further, in the antenna element 200C, radiation electrodes 203D, 206D, 209D, and 212D, via conductors 253D, 257D, 261D, and 265D, via conductors 254D, 258D, 262D, and 266D, line conductor patterns 271D to 274D, and ground electrodes 281C to 284C are added. In the configuration of the dielectric substrate 220C, the dielectric layers 221 and 223 and the portion 293 are replaced with dielectric layers 221C and 223C and a portion 293C, respectively, while a dielectric layer 224 and portions 294 and 295 are added. Since the configuration other than these is similar, the descriptions thereon are not repeated.

As illustrated in FIG. 14, the dielectric layer 221C (a first dielectric layer) is formed from a flexible material. The dielectric layer 221C is bent in the portions 292 and 294. The portion 295 shaped like a flat plate is joined to the portion 294 and extends in the Y axis direction. The dielectric layer 224 is formed in the portion 295. The dielectric layer 223C is formed in the portion 293. The dielectric substrate 220C is formed so as to be wound around an end portion of the mounting board 320. The dielectric substrate 220C may be formed from an integral dielectric. The portion 295 may be fixed to an unillustrated cabinet with a bonding layer interposed therebetween. The portion 295 may be formed so as to be close to the mounting board 320.

The radiation electrodes 203C, 206C, 209C, and 212C are formed in the portions 293C and 294 and arranged so as to be along the X axis. In the portion 293C, the radiation electrodes 203C, 206C, 209C, and 212C lie opposite to the ground electrode 232C in the Y axis direction. In the portion 294, the radiation electrodes 203C, 206C, 209C, and 212C lie opposite to the ground electrode 232C in the thickness direction of the portion 294.

The radiation electrodes 203D, 206D, 209D, and 212D are arranged so as to be along the X axis in the portion 295. The normal direction of the radiation electrodes 203D, 206D, 209D, and 212D is the Z axis direction.

The ground electrode 232C is formed on the dielectric layer 221C in the portions 291, 292, 293C, 294, and 295. The ground electrode 232C lies opposite to the radiation electrodes 203D, 206D, 209D, and 212D in the Z axis direction. The ground electrode 232C is coupled to the ground electrode 231.

The ground electrodes 281C to 284C are formed in the portions 293C, 294, and 295 and arranged in the dielectric layer 221C so as to be along the X axis. The ground electrodes 281C to 284C are coupled to the ground electrode 232C by a plurality of via conductors.

The line conductor patterns 271C to 274C are formed in the dielectric layer 221C in the portions 291, 292, and 293C. The line conductor pattern 271C is formed between the ground electrodes 232C and 281. The line conductor pattern 272C is formed between the ground electrodes 232C and 282. The line conductor pattern 273C is formed between the ground electrodes 232C and 283. The line conductor pattern 274C is formed between the ground electrodes 232C and 284.

The via conductors 253C, 257C, 261C, and 265C run through the ground electrode 231 and couple the line conductor pattern 271C and the RFIC 240B, the line conductor pattern 272C and the RFIC 240B, the line conductor pattern 273C and the RFIC 240B, and the line conductor pattern 274C and the RFIC 240B, respectively. The via conductors 253C, 257C, 261C, and 265C are insulated from the ground electrode 231.

The via conductor 254C couples the line conductor pattern 271C and the radiation electrode 203C. The via conductor 258C couples the line conductor pattern 272C and the radiation electrode 206C. The via conductor 262C couples the line conductor pattern 273C and the radiation electrode 209C. The via conductor 266C couples the line conductor pattern 274C and the radiation electrode 212C.

The RFIC 240B supplies radio frequency signals to the radiation electrodes 203C, 206C, 209C, and 212C through the line conductor patterns 271C to 274C, respectively. The RFIC 240B receives radio frequency signals from the radiation electrodes 203C, 206C, 209C, and 212C through the line conductor patterns 271C to 274C, respectively.

The line conductor patterns 271D to 274D are formed in the dielectric layer 221C in the portions 291, 292, 293C, 294, and 295. The line conductor pattern 271D is formed between the ground electrodes 232C and 281 while formed between the ground electrodes 232C and 281C. The line conductor pattern 272D is formed between the ground electrodes 232C and 282 while formed between the ground electrodes 232C and 282C. The line conductor pattern 273D is formed between the ground electrodes 232C and 283 while formed between the ground electrodes 232C and 283C. The line conductor pattern 274D is formed between the ground electrodes 232C and 284 while formed between the ground electrodes 232C and 284C.

The via conductors 253D, 257D, 261D, and 265D run through the ground electrode 231 and couple the line conductor pattern 271D and the RFIC 240B, the line conductor pattern 272D and the RFIC 240B, the line conductor pattern 273D and the RFIC 240B, and the line conductor pattern 274D and the RFIC 240B, respectively. The via conductors 253D, 257D, 261D, and 265D are insulated from the ground electrode 231.

The via conductor 254D couples the line conductor pattern 271D and the radiation electrode 203D. The via conductor 258D couples the line conductor pattern 272D and the radiation electrode 206D. The via conductor 262D couples the line conductor pattern 273D and the radiation electrode 209D. The via conductor 266D couples the line conductor pattern 274D and the radiation electrode 212D.

The RFIC 240B supplies radio frequency signals to the radiation electrodes 203D, 206D, 209D, and 212D through the line conductor patterns 271D to 274D, respectively. The RFIC 240B receives radio frequency signals from the radiation electrodes 203D, 206D, 209D, and 212D through the line conductor patterns 271D to 274D, respectively.

In the antenna element 200C, the dielectric substrate 220C is bent in the portions 292 and 294 and accordingly, the normal direction of the radiation electrodes 201, 204, 207, and 210, 203D, 206D, 209D, and 212D (which is the Z axis direction), the normal direction of the radiation electrodes 202, 205, 208, and 211 (which is the thickness direction of the portion 292), the normal direction of the radiation electrodes 203C, 206C, 209C, 212C in the portion 293C (which is the Y axis direction), and the normal direction of the radiation electrodes 203C, 206C, 209C, and 212C in the portion 294 (which is the thickness direction of the portion 294) are different from one another. In the antenna module 1200B, radio frequency signals with polarized waves different in excitation direction can be transmitted and received more easily in comparison with the case where the normals of a plurality of radiation electrodes are parallel.

Further, in the antenna element 200C, the dielectric layer 221C is formed from a flexible material and therefore the stress caused in the portions 292 and 294 that are bent can be reduced. Accordingly, in the portions 291, 293C, and 295, the evenness of a surface of the dielectric substrate 220C can be maintained. Thus, the deviation of the normal direction of each radiation electrode from a desired direction can be inhibited. As a result, the decrease in the characteristics of the antenna element 200C caused by bending the dielectric substrate 220C can be inhibited.

Thus, the communication devices according to the third embodiment and the first variation and the second variation thereof enable it to improve the radiation characteristics of each antenna element.

The embodiments disclosed herein are each planned to be also implemented by being suitably combined within a scope where no contradiction is caused. It should be noted that the above-described embodiments disclosed herein are examples in all respects and not limiting. It is intended that the scope of the present disclosure is not specified by the foregoing description but is specified by the claims and that the present disclosure encompasses all changes within meanings equivalent to the claims and the scope thereof.

10, 100, 100A, 100B, 200, 200A, 200B, and 200C ANTENNA ELEMENTS
31A to 31D, 33A to 33D, and 37 SWITCHES
32AR to 32DR LOW NOISE AMPLIFIERS
32AT to 32DT POWER AMPLIFIERS
34A to 34D ATTENUATORS
35A to 35D PHASE SHIFTERS
36 BRANCHING UNIT
38 MIXER
39 AMPLIFICATION CIRCUIT
101, 102, 291 to 294, 292B, 293B, and 293C PORTIONS
110 to 112, 201 to 212, 202B, 203B to 203D, 205B, 206B to 206D, 208B, 209B to 209D, 211B, and 212B to 212D RADIATION ELECTRODES
120, 120A, 220, 220B, and 220C DIELECTRIC SUBSTRATES
121, 122, 221 to 224, 221B, 221C, 223B, and 223C DIELECTRIC LAYERS
131, 132, 231, 231B, 232, 232B, 232C, 281 to 284, 281B to 284B, and 281C to 284C GROUND ELECTRODES

150 to 152, 251 to 266, 251A, 251B, 252A, 252B to 266B, 253C, 253D, 254A to 256A, 254C, 254D, 257C, 257D, 258A to 260A, 258C, 258D, 261C, 261D, 262A to 264A, 262B, 262D, 265C, 265D, 266A, 266C, and 266D VIA CONDUCTORS

271 to 274, 271A to 274A, 271B to 274B, 271C to 274C, 271D to 274D, and 275 to 278 LINE CONDUCTOR PATTERNS

320 and 320A MOUNT BOARDS

321, 322, 331, and 332 CONNECTORS

1100, 1100A, 1100B, 1200, 1200A, 1200B, 1300, 1300A, and 1300B ANTENNA MODULES

3000, 3000A, and 3000B COMMUNICATION DEVICES

The invention claimed is:

1. An antenna element comprising:

a dielectric substrate including a flat-plate-shaped first portion and a second portion thinner than the first portion;

a first ground electrode arranged in the first portion;

a second ground electrode arranged in the second portion;

a via conductor coupling the first ground electrode with the second ground electrode;

a first radiation electrode arranged so as to lie opposite to the first ground electrode in the first portion in a first thickness direction of the first portion and lie opposite to the second ground electrode in the second portion in a second thickness direction of the second portion; and a second radiation electrode, wherein:

a distance between the first radiation electrode and the first ground electrode in the first thickness direction is more than a distance between the first radiation electrode and the second ground electrode in the second thickness direction, a part of the first radiation electrode lies opposite to the first ground electrode without lying opposite to the second ground electrode, the dielectric substrate is bent in the second portion, and a normal direction of the first radiation electrode is different from a normal direction of the second radiation electrode.

2. The antenna element according to claim 1, wherein the dielectric substrate is composed of an integral dielectric.

3. An antenna module comprising:

the antenna element according to claim 2; and a radio frequency element for supplying a radio frequency signal to the antenna element.

4. The antenna element according to claim 1, wherein:

the dielectric substrate includes:

a first dielectric layer provided in the first portion and the second portion, and a second dielectric layer provided in the first portion, the first radiation electrode and the second ground electrode are arranged on the first dielectric layer, and the first ground electrode is arranged on the second dielectric layer.

5. An antenna module comprising:

the antenna element according to claim 4; and a radio frequency element for supplying a radio frequency signal to the antenna element.

6. The antenna element according to claim 1, wherein the second portion is composed of a material having flexibility.

7. An antenna module comprising:

the antenna element according to claim 6; and a radio frequency element for supplying a radio frequency signal to the antenna element.

8. An antenna module comprising:

the antenna element according to claim 1; and a radio frequency element for supplying a radio frequency signal to the antenna element.

9. A communication device comprising the antenna module according to claim 8.

* * * * *